(12) United States Patent
Oberndorfer et al.

(10) Patent No.: US 7,850,409 B2
(45) Date of Patent: Dec. 14, 2010

(54) FASTENING ELEMENT

(75) Inventors: Georg Oberndorfer, Bludenz (AT); Michael Splitt, Munich (DE); Marc Schaeffer, Sigmarzell-Niederstaufen (DE); Simon Oppeneiger, Hoechst (AT); Juergen Gebhard, Alstaetten (CH)

(73) Assignee: Hilti Aktiengesellschaft, Schaan (LI)

( * ) Notice: Subject to any disclaimer, the term of this patent is extended or adjusted under 35 U.S.C. 154(b) by 203 days.

(21) Appl. No.: 12/286,010

(22) Filed: Sep. 26, 2008

(65) Prior Publication Data
US 2009/0092463 A1    Apr. 9, 2009

(30) Foreign Application Priority Data
Oct. 8, 2007  (DE) .................. 10 2007 000 828

(51) Int. Cl.
*F16B 25/10*  (2006.01)
(52) U.S. Cl. .................................... 411/387.5
(58) Field of Classification Search .......... 411/387.2, 411/387.4, 387.8, 386, 411, 423, 938, 387.5
See application file for complete search history.

(56) References Cited
U.S. PATENT DOCUMENTS
2,200,227 A * 5/1940 Olson ........................ 52/364

4,046,051 A * 9/1977 Lovisek ...................... 411/422
6,056,491 A * 5/2000 Hsu ........................... 411/418
7,246,979 B2 * 7/2007 Fujii et al. ................... 411/310

FOREIGN PATENT DOCUMENTS
| DE | 91 03 773 | 9/1992 |
|----|-----------|--------|
| DE | 198 01 105 | 7/1999 |
| DE | 101 13 946 | 9/2002 |
| EP | 1 557 576 | 7/2005 |

\* cited by examiner

*Primary Examiner*—Gary Estremsky
(74) *Attorney, Agent, or Firm*—Abelman, Frayne & Schwab

(57) ABSTRACT

A fastening element has a shaft (12), and a tapping thread (21) carried by the shaft (12) and having at least one screw thread (22, 42) a section (23; 43) of which that adjoins the thread pilot (35), having a plurality of following one another thread steps (24, 25, 26, 27; 44, 45, 46, 47) having different cross-sections, with a cross-section of the at least one screw thread (22; 42) decreasing stepwise toward the thread pilot (35) from a thread step (24, 25, 26, 27; 44, 45, 46, 47) to a thread step (24, 25, 26, 27; 44, 45, 46, 47), with the thread steps (24, 25, 26, 27; 44, 45, 46, 47) having respective cutting edge-forming end surfaces (28, 29, 30, 31; 48, 49, 50, 51) aligned, at least partially, in a direction of the thread pilot (35).

10 Claims, 2 Drawing Sheets

FASTENING ELEMENT

BACKGROUND OF THE INVENTION

1. Field of the Invention

The present invention relates to a fastening element including a shaft, rotation-transmitting means provided at one end of the shaft, the shaft having a free end remote from the rotation-transmitting means, and a tapping thread carried by the shaft and having at least one screw thread with a thread pilot, a section of the at least one screw thread that adjoins the thread pilot, having a plurality of following one another thread steps having different cross-sections, with the thread steps having respective cutting edge-forming end surfaces aligned, at least partially, in a direction of the thread pilot.

2. Description of the Prior Art

Fastening elements of the type described above such as, e.g., concrete screws or sleeves with an internal thread, are screwed in a preliminary formed borehole with a setting tool such as, e.g., a tangential impact screwdriver, with the tapping thread of the fastening element tapping a counter-thread in the borehole wall for anchoring the fastening element in the borehole.

Mineral constructional components, such as concrete or brickwork into which the described above fastening elements are set, are brittle materials. During tapping of the counter-thread, material spalling takes place, which increase the size of the produced counter-thread above the necessary value. Because of this increase, the loads, which are transmitted by the set fastening element, decrease.

The deformations of the fastening element and of the constructional component, which take place during a setting process necessitate a high screw-in torque and, therefore, a correspondingly formed setting tool.

German Publication DE 101 13 946 A1 discloses a fastening element formed as a concrete screw and having rotation-transmitting means that cooperates with a setting tool and a tapping thread-carrying shaft having a free end remote from the rotation-transmitting means. The tapping thread has a screw thread that is provided, in the region of the shaft free end, with cutting notches.

The drawback of the fastening element disclosed in DE 101 13 946 A1 consists in that the counter-thread in the constructional component is produced by crushing and not by cutting. Therefore, during the formation of the counter-thread material, spalling occurs. Thereby, the produced, in the damaged region, undercut substantially limits the load transmission.

German Utility Model DE 91 03 773 U discloses a fastening element which is formed as a self-drilling screw and has a shaft, rotation transmitting means provided at one end of the shaft, the shaft having a free end remote from the rotation-transmitting means, and a tapping thread carried by the shaft. The tapping thread has screw thread with a thread pilot. The screw thread has, proceeding from the thread pilot a plurality of following one another steps having different cross-sections. The thread steps have, respectively, large and small cross-sections, with a thread step with large a cross-section being arranged behind a thread step with a small cross-section, with the thread steps with large and small cross-sections alternating with each other along the screw thread. The thread step with large cross-sections having end surfaces which are formed as cutters and are aligned in the direction of the thread pilot.

The drawback of the fastening element of the German Utility Model consists in that a screw thread with alternatingly arranged thread steps still can cause material spalling during setting of the fastening element.

Accordingly, an object of the present invention is to provide a fastening element with a tapping thread that would produce, in a constitutional component, a counter-thread with essentially almost ideal shape.

SUMMARY OF THE INVENTION

This and other objects of the present invention, which, will become apparent hereinafter, are achieved by providing a fastening element in which a cross-section of the at least one screw thread decreases stepwise toward the thread pilot form a thread step to a thread step, the thread steps. Thus, the cross-section of the at least one screw thread is reduced sharply. The shape of the section of the at least one screw thread is, thus, substantially stepped. The first, with respect to the thread pilot, end surface of the first thread step need not necessarily lie at the thread pilot. E.g., the first end surface can be spaced from the thread pilot, so that from the thread pilot to this end surface of the screw thread, a conventional thread run-out exists in this region.

For starting a thread-tapping process, the free end surface of the first, in the screw-in direction, thread step of the section that adjoins the thread pilot of the at least one screw thread, engages the constructional component. The first thread step has, as it follows from the foregoing description, a smallest cross-section. The further cutting edge-forming, end surface of the adjacent or following thread step further deepens the previously produced counter-thread, with the following end surfaces of the following thread steps continuing this process until a counter-thread that perfectly undercuts the thread of the fastening element is formed. With the thread steps of the section of the at least one screw thread which adjoins the thread pilot, a precise thread undercut is produced, without any noticeable material spalling and without essentially any damage of the constructional component in the region of the constructional component surrounding the counter-thread. In addition, separate cutting edges are subjected to smaller surface pressures.

Advantageously, the thread height of the at least one screw thread decreases stepwise toward the thread pilot from a thread step to a thread step. Starting from the thread pilot, during screw-in of the fastening element, the thread steps deepen the counter-thread that was produced by a thread step that was engaging the constructional component before, in the radial direction until an optimal size of the counter-thread for the thread of the fastening element is obtained.

Under the thread height, the height of the thread crest with respect to the thread root is understood. The thread root usually corresponds to the circumferential surface of the core diameter of the shaft and extends in the radial direction about the longitudinal axis of the shaft of the fastening element.

Advantageously, a thread width at the thread root of the at least one screw thread decreases stepwise toward the thread pilot from a thread step to a thread step. Thus, the end surface of a thread step projects sidewise, advantageously, in both directions transverse to the thread course of the thread step beyond the thread step with a smaller cross-section at the transition between the two steps. Thus, the wider end surface and, thereby, the respective cutting edge has a larger effective surface for an advantageous removal of material, in particular, in brittle materials. During the screw-in of the fastening element, the counter-thread expands in a plane extending parallel to the shaft longitudinal axis until its size increases to a size optimal for the fastening element thread. Advantageously, the thread width of each thread step remains constant at the thread root. In an alternative embodiment, the thread width at the thread root can vary over the extent of the thread crest in the direction of the thread course. Thereby the thread width of a thread crest is advantageously decreases toward the thread pilot along the thread course. Further, the thread width at the thread root of a thread crest can increase and decrease, so that the thread crest can have a slimmed, in the middle, section along its extension in the direction of the thread course.

According to an advantageous embodiment of the present invention, both the thread height and the thread width at the thread root of the at least one screw thread decreases stepwise toward the thread pilot from a thread step to a thread step. The cross-section of the screw thread toward the thread pilot sharply decreases, advantageously, from a thread step to a thread step.

Advantageously, the thread steps each has a constant thread height with respect to the thread root. In this embodiment, the section of the at least one screw-thread, which adjoins the thread pilot, has, in a plane extending parallel to the plane of the thread root, a stepped profile, whereby the removal of material in a constructional component during formation of the counter-thread takes place gradually. The thread crests or the located radially outwardly edges of the screw thread extend parallel to a plane which is spanned by the thread root.

According to another advantageous embodiment of the present invention, the thread steps have a variable height with respect to the thread root, with the thread height of the screw thread decreasing toward the thread pilot. The thread crest or the located, radially outwardly edge of the screw thread is inclined at an angle to a plane the thread root lies. After an end surface of a thread step, the adjacent thereto, thread step continuously penetrate in the constructional component until the next end surface of a thread step adjacent to the just described step again increases the machining depth, preferably sharply.

Advantageously, in the inventive fastening element, the thread crest or the located radially outwardly, edge of the screw thread is aligned either parallel or is inclined to the thread root plane. According to an alternative embodiment, in the inventive fastening element, different orientation of the thread crest can be used, i.e., it can extent parallel to and be inclined to the root plane.

Advantageously, the thread steps extend over a thread region from 10° to 720°, preferably over a thread region from 90° to 360°. This provides a sufficient length of the effective section of the at least one screw thread for producing a counter-thread in the constructional component during the thread tapping process that takes place during setting of the fastening element. The given angular regions refer to the shaft, wherein the region of 360° represents an extension of the thread steps along a complete revolution of the fastening element or a complete circumference of the shaft.

Advantageously, on the at least one screw thread, there are provided from three to ten, preferably, from four to eight thread steps, which insures an advantageous removal of material in the constructional component.

Advantageously, an end surface of a thread step is inclined to a normale to a thread root at an angle from −10° to +10°. The inclination of the end surfaces positively influence cutting of the tapping thread into the constructional component and working behavior of the thread in the constructional component. Advantageously, the end surfaces of all of the thread steps or all of the transitional surfaces from one thread step to the next thread step of the fastening element are inclined at the same angle to the normal to the thread root.

Alternatively, the inclination of the end surfaces of separate thread steps can vary.

Advantageously, the height of the end surfaces of the thread steps with respect to an adjacent thread step or with respect to the crest increases toward the thread pilot. At the start of the setting process of a fastening element, the wall of the constructional component will be stronger tapped by the first end surface adjacent to the thread pilot than by the next end surface, so that the last end surface will increase the size of the already produced undercut or the produced counter-thread only to a very small extent. Therefore, the constructional component is stressed less during the setting process, and the danger of the undesirable material spalling is substantially reduced.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

The drawings show.

Basically, in the drawings, the same elements are designated with the same reference numerals.

DETAILED DESCRIPTION OF THE PREFERRED EMBODIMENT

Figure 1:
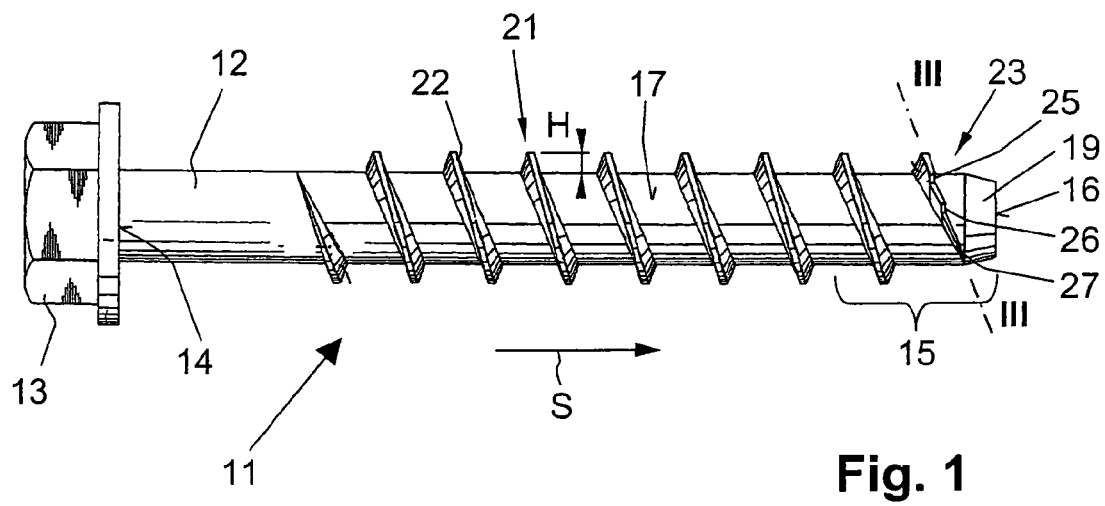
FIG. 1 a side view of a fastening element according to the present invention.
Figure 2:
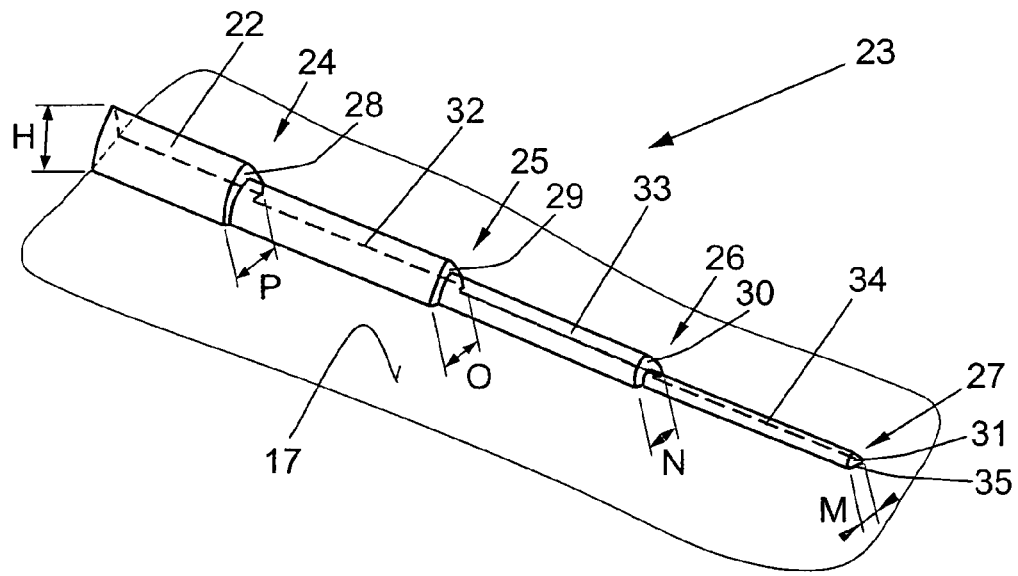
FIG. 2 a partially perspective view of a section of the screw thread shown in FIG. 1 and adjoining the thread pilot.
Figure 3:
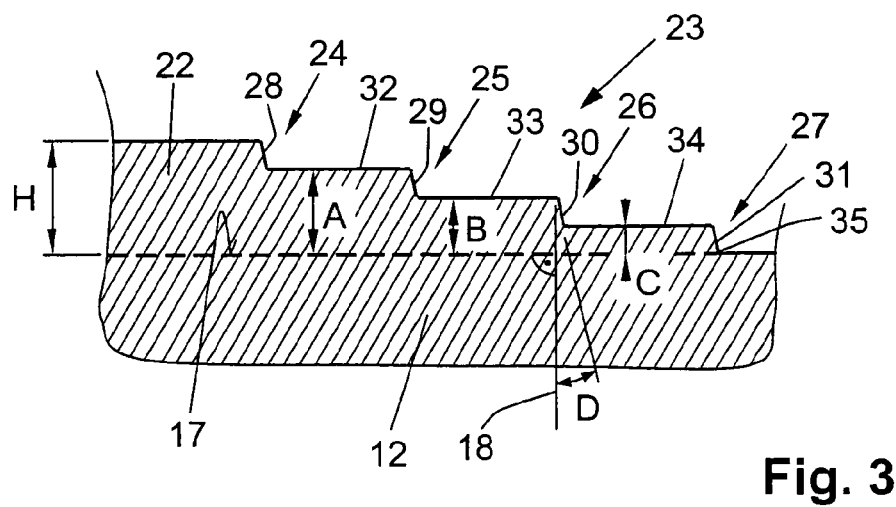
FIG. 3 a partial cross-sectional view of a section of the screw thread shown in FIG. 1 and adjoining the thread pilot along line III-III in FIG. 1.

A fastening element 11 according to the present invention, which is shown in FIGS. 1-3, is formed as a concrete screw for mineral constructional components such as concrete or brickwork and settable in a borehole (not shown). The fastening element 11 has a screw head that serves as rotation transmitting means 13 that cooperates with a setting tool, not shown, and a shaft 12 that carries a tapping thread 21 and has a forward free end 16 remote from the rotating transmitting means 13 or facing in the setting direction. At the forward free end 16 of the shaft 12, there is provided a conically tapering section 19 that facilitates introduction of the fastening element 11 in a borehole, not shown.

The tapping thread 21 has a screw thread 22 with a thread pilot 35 in the region 15 of the free end 16. A section 23 of the screw thread 22 and which adjoins the thread pilot 35, is provided with four thread steps 24, 25, 26, 27 having different cross-sections. Each of the thread steps 24, 25, 26, 27 has an end surface 28, 29, 30, 31 facing in the direction of the thread pilot 35 and formed as cutters for removal of the material of the constructional component. The cross-section of the screw-thread 22 decreases toward the thread pilot 35 from a thread step to a thread step. The thread steps 24, 25, 26, 27 decrease over the threaded region of the thread-tapping section 22, with reference to the thread root 17, from a full thread height H of the screw thread 22 toward the thread pilots 35. The thread steps 24, 25, 26, 27 have, in the direction toward the thread pilot 35, an ever decreasing thread height A, B, and C and thread width P, O, N, and M. The thread steps 24, 25, 26, 27 have, between the end surfaces 28, 29, 30, 31, a constant height A, B, and C with respect to the thread root 17. The thread widths M, N, O of each thread crest 32, 33, 34 at the thread root 17 and the thread width P at the thread root 17 of the screw thread 22 are, respectively, constant over the course of the tapping thread 21. The end surfaces 28, 29, 30, 31 are reduced not only in height but also in width. The thread steps 24, 25, 26, 27 extend over a thread region of about 270°. All of the end surfaces 28, 29, 30, 31 extend to respective perpendiculars 18 to the thread root 17 at angle D of 8°. The end surfaces 28, 29, 30, 31 are aligned in the direction of the end 14 of the shaft 12 at which the rotation-transmitting means 13 is provided and, thus, the cutters have, with respect to the screw-in direction, a negative cutting angle.

Figure 4:
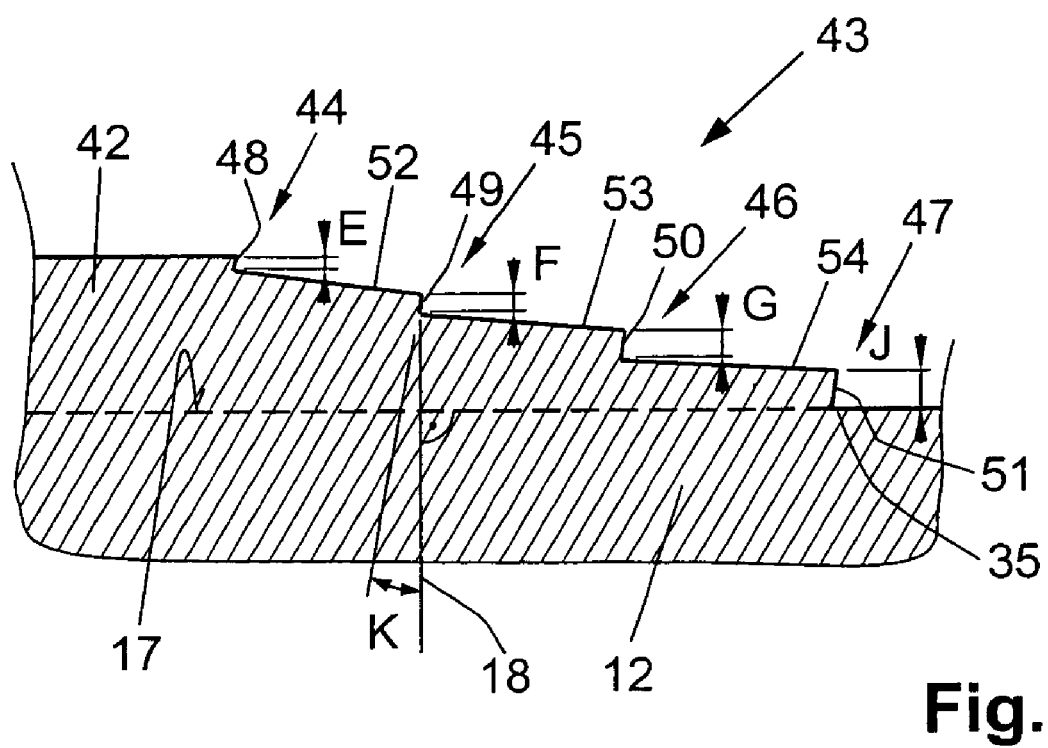
FIG. 4 a partial cross-sectional view similar to that of FIG. 2 of another embodiment of a section of the screw thread shown in FIG. 1 and adjoining the thread pilot.

In the embodiment shown in FIG. 4, the section 43 of the screw-thread 42 and which adjoins the thread pilot, has thread steps 44, 45, 46, 47 the end surfaces 48, 49, 50, 51 of which have, respectively, different height increases E, F, G, and J, with the height increases E, F, G, and J of the end surfaces 48, 49, 50, 51 increasing in the direction of the shaft free end 16 or toward the thread pilot 35. The thread step 44, 45, 46, 47 are inclined toward the plane of the thread root 17 and thus, have a variable thread height with respect to the thread root 17. The thread crests 52, 53, 54 of the thread steps 44, 45, 46, 47 extend remotely from the thread pilot 35, between the end surfaces 48, 49, 50, 51. The thread crest 52 extend to the plane of the thread root 17 at an angle steeper than a corresponding angle of the adjacent thereto, thread crest 53. The thread crest 53 extends to the plane of the thread root 17 at an angle steeper than of the adjacent thereto, thread crest 54. The end surfaces 48, 49, 50, 51 of the thread steps 44, 45, 46, 47 extend all at the same angle K of −5° to a perpendicular 18 to the thread root 17. The end surfaces 48, 49, 50, 51 are aligned toward the thread pilot 35 and have, thus, a positive cutting angle of the cutters with respect to the screw-in direction.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A self-tapping fastening element, comprising a shaft (12); rotation-transmitting means (13) provided at one end (14) of the shaft (12), the shaft having a free end (16) remote from the rotation-transmitting means (13); and a tapping thread (21) carried by the shaft (12) and having at least one screw thread (22, 42) with a thread pilot (35) located in a region (15) of the shaft free end (16), a section (23; 43) of the at least one screw thread (22; 42) that adjoins the thread pilot (35), having a plurality of thread steps following one another, in a circumferential direction, the thread steps (24, 25, 26, 27; 44, 45, 46, 47) each defined by a substantially radial face and a substantially circumferential face and having different size cross-sections, with a cross-section size of the at screw steps (22; 42) continuously decreasing stepwise toward the thread pilot (35) from one thread step (24, 25, 26, 27; 44, 45, 46, 47) to a next thread step (24, 25, 26, 27; 44, 45, 46, 47), the thread steps (24, 25, 26, 27; 44, 45, 46, 47) having respective cutting edge-forming end surfaces (28, 29, 30, 31; 48, 49, 50, 51) aligned, at least partially, in a direction of the thread pilot (35).

2. A fastening element according to claim 1, wherein a thread width (M, N, 0, P) at a thread root (17) of the at least one screw thread (22; 42) decreases stepwise toward the thread pilot (35) from one thread step (24, 25, 26, 27; 44, 45, 46; 47) to a next thread step (24, 25, 26, 27; 44, 45, 46, 47).

3. A fastening element according to claim 1, wherein each one of the thread steps (24, 25, 26, 27) has a constant height (A, B, C) with respect to a thread root (17).

4. A fastening element according to claim 1, wherein each one of the thread steps (44, 45, 46, 47) has a height which varies with respect to a thread root (17).

5. A fastening element according to claim 1, wherein the thread steps (24, 25, 26, 27; 44, 45, 46, 47) extend over a thread region from 10° to 720°.

6. A fastening element according to claim 5, wherein the thread steps (24, 25, 26, 27; 44, 45, 46, 47) extend over a thread region from 90° to 360°.

7. A fastening element according to claim 1, wherein the plurality of thread steps (24, 25, 26, 27; 44, 45, 46, 47) comprises from three to ten thread steps.

8. A fastening element according to claim 7, wherein the plurality of thread steps (24, 25, 26, 27; 44, 45, 46, 47) comprises from four to eight thread steps.

9. A fastening element according to claim 1, wherein an end surface (28, 29, 30, 31; 48, 49, 50, 51) of each thread step (24, 25, 26, 27; 44, 45, 46, 47) defines an angle with respect to a normal to a thread root (17) from −10° to +10°.

10. A fastening element, comprising a shaft (12); rotation-transmitting means (13) provided at one end (14) of the shaft (12), the shaft having a free end (16) remote from the rotation-transmitting means (13); and a tapping thread (21) carried by the shaft (12) and having at least one screw thread (22, 42) with a thread pilot (35) located in a region (15) of the shaft free end (16), a section (23; 43) of the at least one screw thread (22; 42) that adjoins the thread pilot (35), having a plurality of thread steps following one another each defined by a substantially radial face and a substantially circumferential face and having different size cross-sections, with a cross-section size of the at least one screw thread (22; 42) decreasing stepwise toward the thread pilot (35) from one thread step (24, 25, 26, 27; 44, 45, 46, 47) to a next thread step (24, 25, 26, 27; 44, 45, 46, 47), the thread steps (24, 25, 26, 27; 44, 45, 46, 47) having respective cutting edge-forming end surfaces (28, 29, 30, 31; 48, 49, 50, 51) aligned, at least partially, in a direction of the thread pilot (35), wherein a height (E, F, G, J) of an end surface (48, 49, 50, 51) of a thread step (44, 45, 46, 47) increases toward the thread pilot (35) with respect to an immediately preceding thread step.

\* \* \* \* \*